May 3, 1938.  L. T. KOPPL  2,115,992
TAPPING MACHINE
Filed March 14, 1936  4 Sheets-Sheet 1
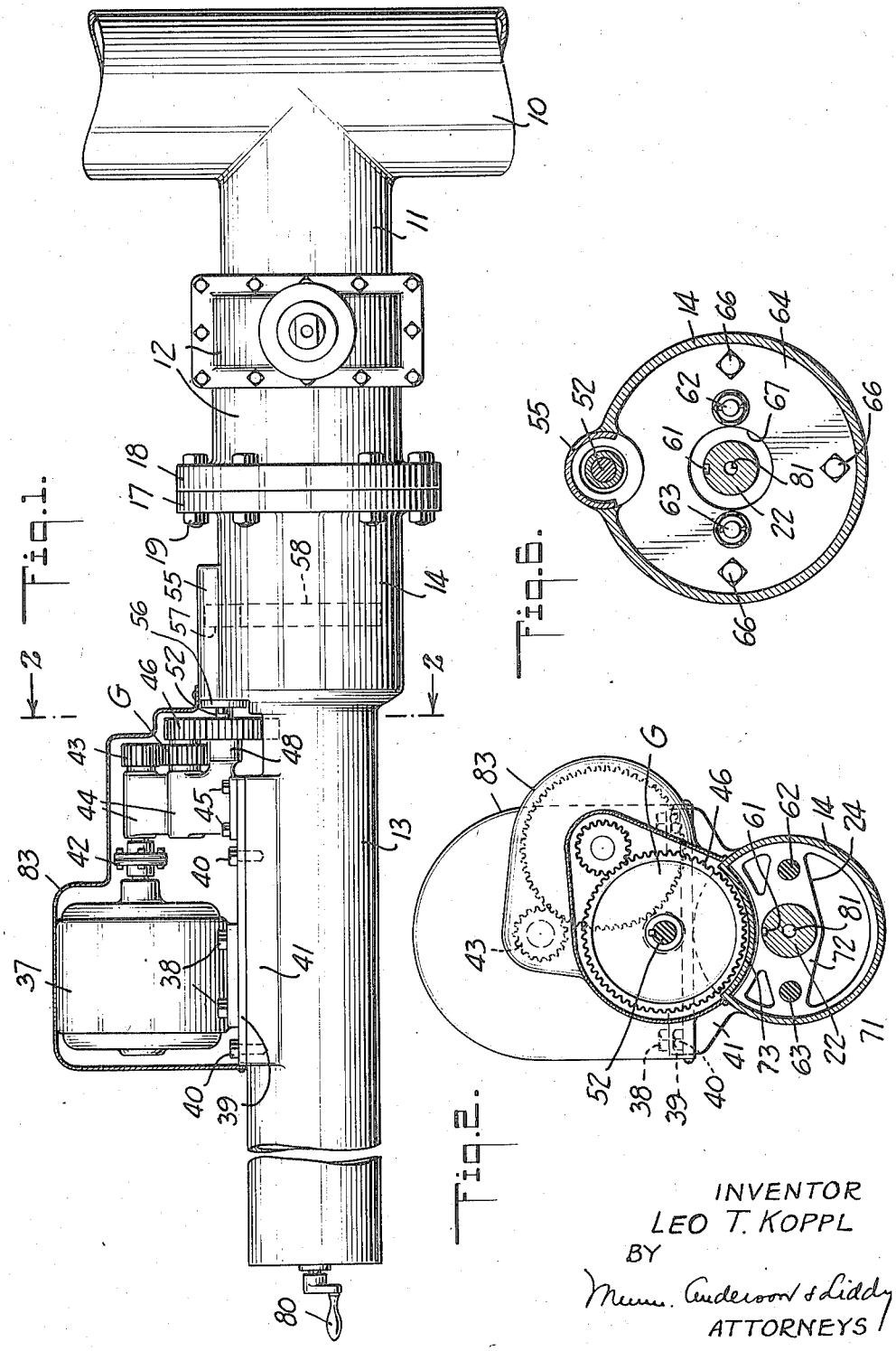
INVENTOR
LEO T. KOPPL
BY
Munn, Anderson & Liddy
ATTORNEYS

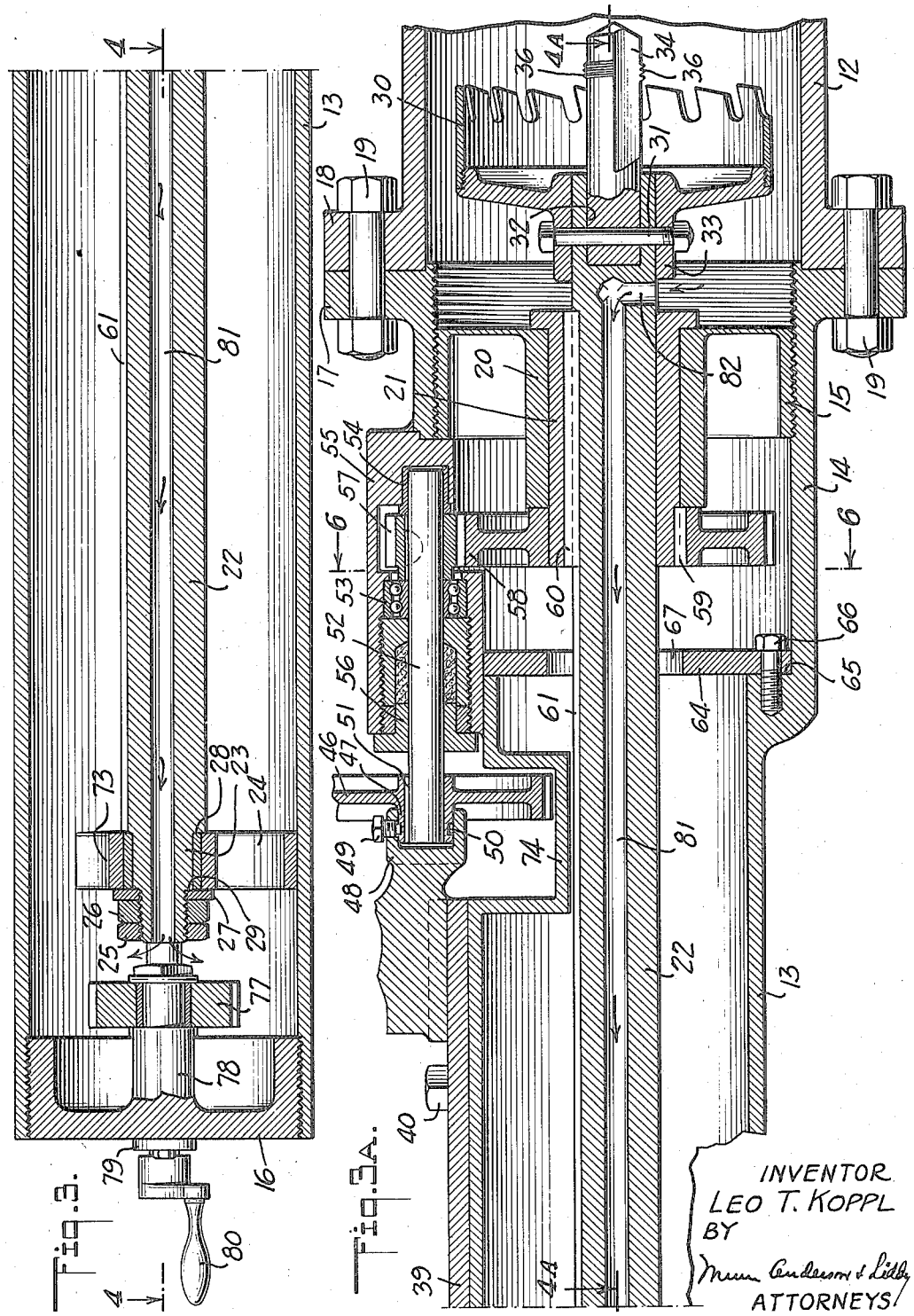

May 3, 1938.  L. T. KOPPL  2,115,992
TAPPING MACHINE
Filed March 14, 1936  4 Sheets-Sheet 3
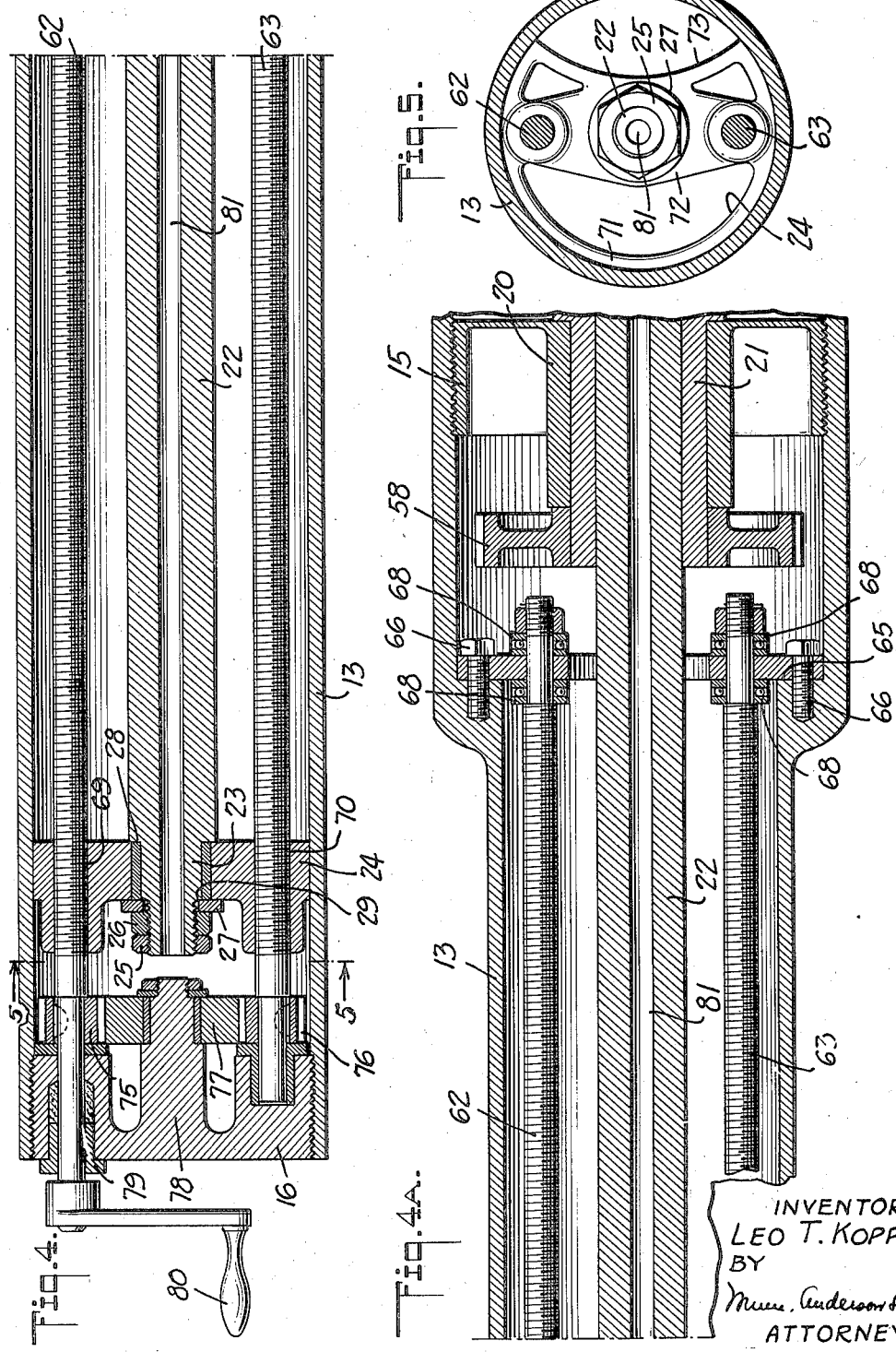
INVENTOR
LEO T. KOPPL
BY
ATTORNEYS

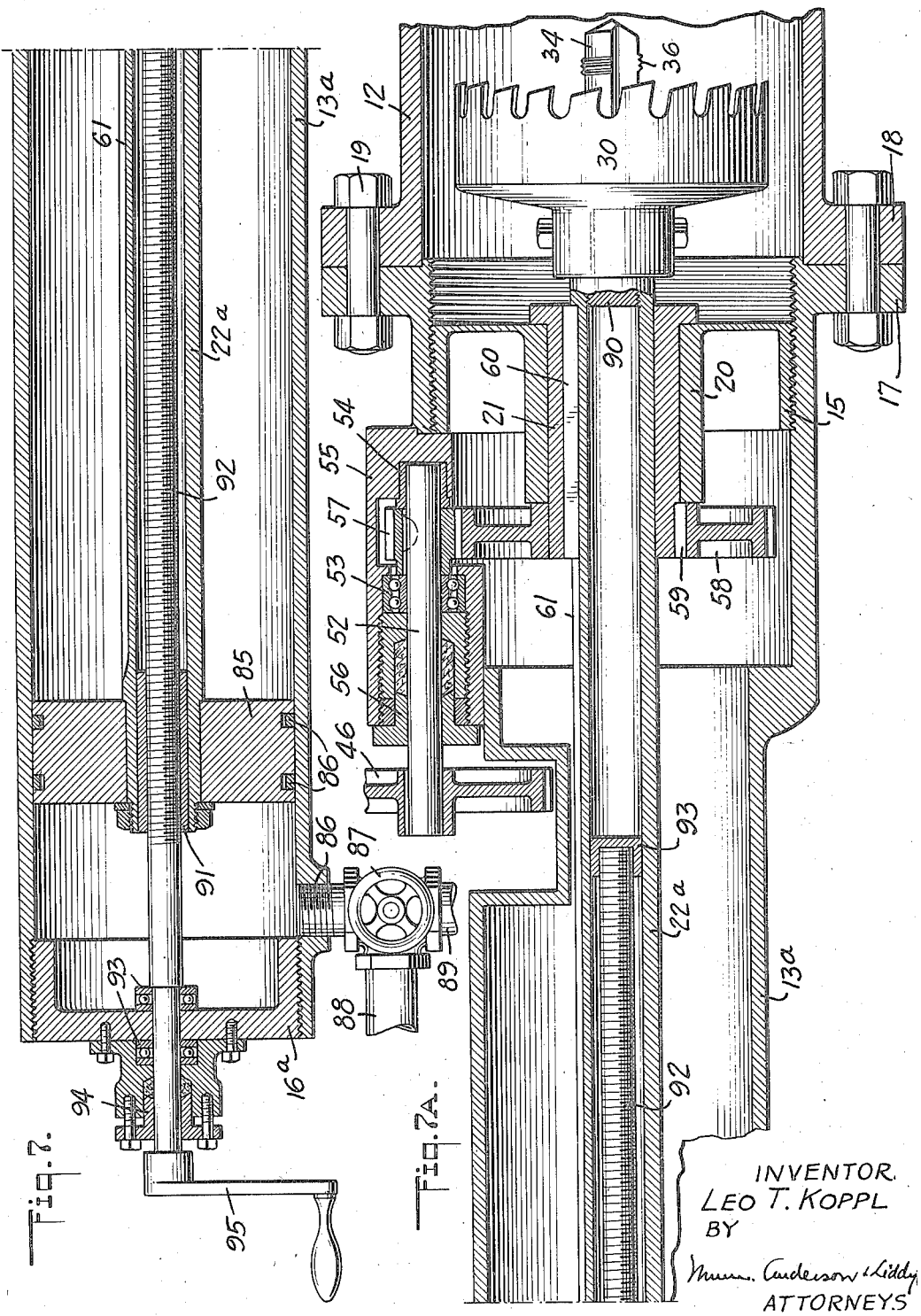

Patented May 3, 1938

2,115,992

UNITED STATES PATENT OFFICE 2,115,992

TAPPING MACHINE

Leo T. Koppl, Huntington Beach, Calif.

Application March 14, 1936, Serial No. 68,879

8 Claims. (Cl. 77—42)

This invention relates generally to the art of tapping fluid pressure lines to provide branch lines leading therefrom, and without the necessity of cutting off the flow of fluid in the line being tapped.

An object of this invention is to provide a machine structurally characterized in a manner to enable a fluid line to be safely and expeditiously tapped and a branch connection established irrespective of the pressure existing in the tapped line, and without in any way interfering with the flow of fluid therethrough, so that lines containing fluids and/or liquids at extremely high pressures can be handled with as much ease, dispatch and absence of danger to the operator as are low pressure lines.

Another object of this invention is to provide a tapping machine of the above described character wherein the tapping mechanism is caused to be subjected to the pressure of the line being tapped, or to an extraneously developed pressure, in a manner to establish a balancing or equalizing of pressure so as to either reduce to a negligible quantity or to entirely eliminate any back pressure upon the mechanism which would resist its normal operation and prevent the operator from manipulating the mechanism as well as determining the progress of the operation, all to the end of obviating the dangers and difficulties experienced with tapping machines heretofore proposed, when used on high pressure lines.

A further object of the invention is to provide a line tapping machine characterized by its portability so as to enable it to be readily applied to and removed from the work, and which embodies novel cutting mechanism and feeding mechanism therefor, of simple and rugged construction.

A still further object of the invention is to provide a line tapping machine wherein means is provided for preventing the section of material, cut out by the tapping operation from being lost in the line, by retaining such section for removal from the machine as desired, all to the end of obviating the difficulties involved in the recovery of such a section from the line.

With these and other objects in view, the invention consists in the combinations, arrangements and functional relationship of elements as set forth in the following specification and particularly pointed out in the appended claims.

In the accompanying drawings—

Figure 1 is a view showing in side elevation, partly broken away, one form of tapping machine embodying this invention applied to a fluid line to be tapped for a branch connection;

Figure 2 is a transverse sectional view taken on line 2—2 of Figure 1;

Figures 3 and 3a are views forming continuations of each other and together producing a central longitudinal sectional view of the tapping mechanism shown in the preceding figure;

Figures 4 and 4a are longitudinal sectional views taken respectively on the lines 4—4 and 4a—4a of Figures 3 and 3a;

Figure 5 is a transverse sectional view taken on the line 5—5 of Figure 4;

Figure 6 is a transverse sectional view on a reduced scale and taken on the line 6—6 of Figure 3a;

Figures 7 and 7a are views similar to Figures 3 and 3a, respectively, and together producing a longitudinal sectional view of a modified form of the invention.

Referring particularly to Figures 1 to 6, inclusive, this embodiment of the invention is shown in Figure 1 associated with a fluid pressure line 10 which is to be tapped, and which is prepared for tapping by having welded or otherwise secured thereto at the desired location and angle, a short branch pipe section 11. Attached in any suitable manner to the free end of the pipe 11 is a gate valve 12 for controlling the flow of fluid from the line 10 through a branch line (not shown) adapted to be connected to the valve following the tapping of the line 10 within the pipe section 11 as will be later described.

The tapping machine as embodied in the above mentioned figures comprises an elongated housing 13 which is generally cylindrical, with its forward end of enlarged diameter as indicated at 14, and with its ends closed by heads 15 and 16 threaded into the respective ends of the housing as clearly shown in Figures 3 and 3a. At its forward end the housing is provided with an external flange 17 which is adapted to coact with a mating flange 18 on the valve 12, and with bolts 19, to detachably secure the housing to the valve in axial alinement therewith and with the pipe section 11, as is shown in Figure 1.

The head 15 is provided with a hub 20 coacting with a bushing 21 therein to provide a bearing in which the forward end of a cutter shaft 22 is journaled. The reduced rear end 23 of the cutter shaft is journaled in a crosshead 24 freely slidable in the bore of the housing 13; and the rear extremity of the shaft is further reduced in diameter and threaded to receive nuts 25 and 26 coacting with a washer 27 and the annular shoulders 28 and 29 on the shaft to confine the crosshead against displacement axially of the shaft, yet permit free rotation of the latter relative to the crosshead.

Forward of the head 15 is a shell cutter 30 which is secured to the shaft by means of a bolt 31 passing diametrically through a socket 32 in the forward end of the shaft, and through the hub 33 of the cutter. A pilot drill or bit 34 seats in the socket 32 and is secured therein by the bolt 31, so that the forward end of the drill is disposed in advance of the teeth of the cutter 30. Provided on the drill at a point also in advance of the cutter teeth is a screw threaded portion which forms a screw tap 36 adapted to cut threads in the hole bored by the pilot drill in the wall of the line 10, all for a purpose to be later described.

The cutter 30 is adapted to be power driven by an electric motor 37 bolted at 38 to a base plate 39 secured by bolts 40 to a platform 41 welded to the housing 13 to form an integral part thereof as shown in Figures 1 and 2. Through a coupling 42 the motor drives a pinion gear 43 forming one of a train of gears G journaled in a bracket 44 secured by bolts 45 to the base plate 39. The final gear 46 of the gear train G has its hub 47 journaled in an extension 48 of the bracket 44 and confined against axial displacement by means of a set screw 49 threaded into the bracket and projecting into an annular groove 50 of the hub 47.

The gear 46 has a slidable key connection at 51 with the exteriorly projecting end of a countershaft 52 journaled in bearings 53 and 54 in a radial enlargement 55 of the portion 14 of the housing 13. The countershaft 52 passes through a packing gland 56 to prevent the leakage of pressure around the shaft from within the housing; and intermediate the bearings 53 and 54 the shaft has keyed thereto a pinion gear 57 meshing with a relatively large gear 58 keyed at 59 to the bushing 21. The bushing 21 is provided with a key 60 slidably fitting a keyway 61 extending longitudinally in the cutter shaft 22 for substantially the length thereof, so that when the motor 37 is in operation, the cutter shaft will be positively rotated, yet can be fed axially.

In the present instance the axial feeding of the cutter shaft to advance and retract the cutter with respect to the work is accomplished manually by a manually operable mechanism. This mechanism comprises a pair of feed shafts 62 and 63 disposed in the housing 13 at opposite sides of and in parallelism to the cutter shaft 22. The feed shafts are journaled at their forward ends in a plate 64 seating against an annular shoulder 65 in the enlarged portion 14 of the housing, and secured thereto by bolts 66, the plate having a central opening 67 through which the cutter shaft freely extends. Bearings 68 for taking axial thrusts upon the feed shafts are disposed at opposite sides of the plate 64 as clearly shown in Figure 4a.

The feed shafts are threaded throughout their lengths and pass through threaded bores 69 and 70 in the cross head 24 which, as will be noted from Figure 5, has a rim portion 71 and a diametric web portion 72, a part of the rim being cut away to provide a recess 73 which enables the crosshead when fed to an extreme forward position, to pass a recessed portion 74 of the housing 13 receiving the gear 46. The rear ends of the feed shafts are journaled in the head 16 and have keyed thereto, within the housing, identical pinion gears 75 and 76 constantly meshing with a central idler gear 77 rotatably mounted on an axial stud 78 projecting from the head 16.

The feed shaft 62 extends exteriorly of the housing through a packing gland 79 provided in the head, and has fixed thereto a hand crank 80 by which the shaft can be rotated. It will be clear that upon rotation of the shaft 62, the other shaft 63 will be correspondingly rotated to feed the crosshead 24 and hence the cutter 30 axially in the housing as the cutter is being driven by the motor 37.

The cutter shaft 22 is provided axially with a longitudinal passage 81 opening at the rear end of the shaft to the interior of the housing. At its forward end the passage 81 communicates with a radial passage 82 formed in the shaft between the forward end of the bushing 21 and the hub of the cutter 30 so as to open into the interior of the body of the gate valve 12 in order that upon tapping into the line 10 the pressure fluid therein will be free to enter and fill all unoccupied space within the housing 13. Thus the housing actually forms part of a sealed enclosure defined by the pipe section 11 and the body of the gate valve 12, and including the portion of the line 10 to be removed.

The motor 37 and gear train G are enclosed by a removable casing 83, and it will be noted that upon removal of the casing and of the bolts 40, the base plate 39 can be slid rearwardly on the platform 41 until the gear 46 has been withdrawn clear of the countershaft 52, following which the entire power plant and transmission can be dismounted from the housing 13, to the end of greatly facilitating the handling of the machine in applying same to and removing it from a fluid line.

The operation of the form of tapping machine above described is as follows:

Let it be assumed that the line 10 carrying fluid at high pressure has been prepared for tapping by having the pipe section 11 and gate valve 12 applied as shown in Figure 1. The housing 13 of the machine is bolted to the valve 12 and the latter is fully opened, following which current is supplied to the motor 37 to drive the cutter 30. The crank handle 80 is now manipulated to feed the cutter shaft 22 axially so that the pilot drill 34 will drill through the wall of the line 10, and the opening thus formed in the wall will then be threaded by the screw tap 36 on the drill.

Upon initial penetration of the wall of the line 10 by the drill 34 the high pressure fluid in the line will immediately leak therefrom around the drill into the enclosure defined by the pipe section 11 and body of the gate valve in which the cutter works, then through the passages 82 and 81 so as to completely fill all unoccupied space in the housing 13 between the heads 15 and 16. As the pressures within the line 10 and in the housing 13 are now balanced or equalized, the cutting mechanism can be sensitively fed irrespective of the amount of pressure in the line, and the progress of the cutting operation upon the wall of the line 11 by the cutter 30 accurately gaged. It will be appreciated that the cutter and other moving parts of the cutting mechanism will be free of any back pressure which would resist the progress of the cutting operation or render the forward axial feeding of the cutter difficult, as the parts actually float in the pressure medium which would only manifest itself if in liquid form, by what negligible resistance it would set up to the rotation of the parts.

When the cutter 30 has fully cut through the wall of the line 10, the disk-like section thus removed from the wall will be confined on the drill 34 by the threads of the screw tap 36, which have previously passed through the wall. The current supply to the motor 37 is now discontinued and the cutter adjusted to the fully retracted position shown in Figure 3a by reverse actuation of the handle 89. The gate valve 12 is now closed, following which the housing 13 can be unbolted from the valve. The section removed from the wall of the line 10 by the cutter 30 can then be removed from the drill 34 by unscrewing the section past the tap threads 36, following which the housing can be drained of any liquid from the pressure fluid, and the machine will again be ready for use.

Reference will now be had to Figures 7 and 7a in which a modified form of tapping machine is shown. This form differs mainly from the form previously described by utilizing a pressure fluid from an extraneous source to balance the pressure of the line 10 imposed on the cutter upon initial penetration of the line. This form differs structurally from the previous form by the omission of the passages 81 and 82 and the substitution for the cross head 24 of a solid piston 85 fixed to the rear end of the cutter shaft 22a and having packing rings 86 which seal against the internal wall of the housing 13a.

At the rear head 16a of the housing, the latter is provided with an inlet 86 controlled by a three-way valve 87 and adapted to place the portion of the housing between the piston 85 and head 16a in communication through the pipe 88 with an extraneous source of pressure (not shown) sufficient to equalize the pressure in the line 10. The valve also enables the housing to be vented to atmosphere through a pipe 89 so as to relieve the housing of the pressure when the tapping operation has been completed.

Furthermore, the feeding mechanism for the cutter in this form of the invention has been modified as follows: The cutter shaft 22a is tubular with its forward end plugged at 90 and its rear end provided with an internally threaded feed bushing 91 fixed in the shaft and threadedly receiving a feed shaft 92, the forward end of which is maintained centered in the shaft by a collar 93 threaded thereon and freely slidable in the bore of the shaft.

The rear end of the feed shaft 92 is reduced in diameter and journaled axially in the head 16a. Suitable thrust bearings 93—93 are provided for the shaft at opposite sides of the head, and the shaft extends exteriorly of the head through a packing gland 94. A handle crank 95 is fixed to the shaft for rotating the latter in order to feed the cutter shaft and hence the cutter axially in the same manner and for the same purpose as described in connection with the first form of the invention.

It will be appreciated that when the cutter 30 is subjected to the pressure in the line 10, that the counter pressure set up in the housing at the rear of the piston will counteract the line pressure resisting forward axial feeding of the cutter, thus providing the same advantages as the first described form of the invention.

It will be understood that the extraneous source of pressure can be provided by an air tank in conjunction with a suitable air compressor, or that other artificially developed sources of pressure can be utilized.

I claim:

1. A machine for tapping high pressure fluid lines to provide for branch lines therefrom comprising cutting mechanism including a rotary and axially movable cutter; cutter feeding mechanism including a reciprocating part for advancing the cutter axially against the work; means enclosing the cutting and feeding mechanism, including said reciprocating part and the portion of the line to be removed, in a sealed chamber; means co-acting with said chamber, to sufficiently relieve the mechanisms therein of the resistance of the line pressure to the operation of such mechanisms, as to enable the cutter to be manually fed sensitively and easily, irrespective of the amount of pressure in the line; means for actuating the feeding mechanism from exteriorly of the sealed chamber; and means for driving the cutting mechanism.

2. A machine for tapping high pressure fluid lines to provide for branch lines therefrom comprising cutting mechanism including a rotary and axially movable cutter; cutter feeding mechanism including a rotary feed screw and a reciprocating nut thereon for advancing and retracting the cutter relative to the work in response to rotation of the feed screw; means enclosing the cutting and feeding mechanism with all reciprocating parts thereof and the portion of the line to be removed, in a sealed chamber; means co-acting with said chamber, to sufficiently relieve the mechanisms therein of the resistance of the line pressure to the operations of such mechanisms, as to enable the cutter to be manually fed sensitively and easily irrespective of the amount of pressure in the line; manually operable means for rotating the feed screw from exteriorly of the chamber; and means for driving the cutter.

3. A machine for tapping high pressure fluid lines to provide for a branch line therefrom comprising cutting mechanism including a rotary and axially movable cutter; feeding mechanism for the cutter including an axially movable part for advancing the cutter axially against the work; means for enclosing the cutting and feeding mechanisms and the portion of the line to be removed, in a sealed chamber; means by which the resistance of the line pressure to the operation of the cutting and feeding mechanisms following initial penetration of the line is neutralized or rendered so negligible as to enable the cutter to be manually fed sensitively and easily in the presence of high line pressure; manually operable means for actuating the feeding mechanism from exteriorly of the chamber; and means for driving the cutting mechanism.

4. A machine for tapping high pressure fluid lines to provide for a branch line therefrom comprising cutting mechanism including a rotary and axially movable cutter; feeding mechanisms for the cutter including a rotary feed screw and an axially movable nut thereon for advancing and retracting the cutter relative to the work in response to rotation of the feed screw; means for enclosing the cutting and feeding mechanisms and the portion of the line to be removed, in a sealed chamber; means by which the resistance of the line pressure to the axial feed of the cutter and said nut following initial penetration of the line, is neutralized or rendered so negligible as to relieve the threads of the feed screw from the load of an unbalanced pressure upon the nut so as to enable the cutter to be manually fed sensitively and easily in the presence of high line pressure; manually operable means by which the feed screw can be rotated from exteriorly of the chamber; and means for driving the cutting mechanism.

5. The combination, with means adapted to co-act with a portion of a pipe line to be removed, in defining a sealed enclosure; of cutting mechanism contained wholly within said enclosure and including a rotary and axially movable cutter; feeding mechanism for said cutter contained in said enclosure and including an axially movable part for advancing the cutter against the work; means for subjecting said enclosure to pressure in the line when penetrated by the cutter whereby equalization of line pressure upon the cutting and feeding mechanisms will be effected so as to enable the cutter to be manually fed sensitively and easily in the presence of high line pressure in the enclosure; manually operable means by which the feeding mechanism can be actuated from exteriorly of the enclosure; and means for driving the cutting mechanism.

6. The combination, with means adapted for co-action with a portion of a pipe line to be removed, in defining a sealed enclosure; of cutting mechanism contained wholly within said enclosure and including a rotary and axially movable cutter; cutter feeding mechanism contained in said enclosure and including a feed screw and a co-acting nut axially movable in response to rotation of the feed screw in axially feeding the cutter, means co-acting with said enclosure to subject the mechanism therein to pressure in the line when penetrated by the cutter, whereby equalization of line pressure upon the cutting mechanism and said nut will relieve the threads of the feed screw from the load of an unbalanced pressure upon the nut so as to enable the cutter to be manually fed sensitively and easily in the presence of high line pressure in the enclosure; manually operable means by which the feed screw can be rotated from exteriorly of the enclosure; and means for driving the cutting mechanism.

7. The combination with means adapted to co-act with a portion of a pipe line to be removed, in defining a sealed enclosure; a cutter; a driving member to which said cutter is fixed; means for mounting the cutter and driving member wholly within the enclosure for rotation and axial movement; mechanism in the enclosure for axially feeding the driving member and including co-acting parts, one of which is axially movable with the driving member, and the other rotatable to axially move the first part; means co-acting with said enclosure to sufficiently equalize whereby the equalization of line pressure upon the cutter, driving member, and axially movable part of said mechanism as to enable the cutter to be manually fed sensitively and easily in the presence of high pressure; manually operable means by which said rotatable part of said mechanism can be rotated from exteriorly of the enclosure; and means for driving said driving member.

8. The combination, with means adapted to co-act with a portion of a pipe line to be removed, in defining a sealed enclosure; of a cutter in the enclosure; a drive shaft to which said cutter is fixed, journaled and axially movable in the enclosure and contained wholly within the latter; a feed screw journaled in the enclosure and confined against axial displacement; a feed nut in the enclosure, threadedly receiving said screw and connected to said shaft to feed the latter axially in response to rotation of said screw; means co-acting with said enclosure to subject the latter to pressure in the line when penetrated by the cutter, whereby the line pressure in being equalized upon the cutter, shaft, and nut will be ineffective to oppose manual feeding of these parts axially in advancing the cutter against the work; manually operable means by which the feed screw can be rotated from exteriorly of the enclosure; and means for driving the shaft.

LEO T. KOPPL.